United States Patent
Riek et al.

[19]

[11] Patent Number: 5,987,179
[45] Date of Patent: Nov. 16, 1999

[54] METHOD AND APPARATUS FOR ENCODING HIGH-FIDELITY STILL IMAGES IN MPEG BITSTREAMS

[75] Inventors: Jonathan K. Riek, Webster; Majid Rabbani, Pittsford; Arif T. Erdem, Rochester, all of N.Y.

[73] Assignee: Eastman Kodak Company, Rochester, N.Y.

[21] Appl. No.: 08/925,837

[22] Filed: Sep. 5, 1997

[51] Int. Cl.[6] ............................................ G06K 9/00
[52] U.S. Cl. ................................. 382/236; 382/239
[58] Field of Search ........................... 348/416, 423, 348/845.1, 845.3, 7, 408; 714/756, 822, 824; 341/51; 382/243, 239, 232, 233, 234, 235, 236, 238, 240, 244, 248, 250, 251, 252, 253; 709/219, 231; 455/4.2; 358/403, 439

[56] References Cited

U.S. PATENT DOCUMENTS

| | | | |
|---|---|---|---|
| 5,666,161 | 9/1997 | Kohiyama et al. | 348/408 |
| 5,712,976 | 1/1998 | Falcon, Jr. et al. | 395/200.09 |
| 5,748,789 | 5/1998 | Lee et al. | 382/243 |
| 5,836,003 | 11/1998 | Sadeh | 341/51 |
| 5,896,176 | 4/1999 | Das et al. | 348/416 |

OTHER PUBLICATIONS

"An MPEG Camera With Tapeless Video Recording" Imaide et al., Yokohama, Japan, (pp. 342–343), FAM 18.1, (0–7803–3734–4/97), 1997, IEEE, (No Place of Public.).

*Primary Examiner*—Bijan Tadayon
*Attorney, Agent, or Firm*—Thomas H. Close

[57] ABSTRACT

A frame in an uncompressed digital video signal is selected for encoding as a high-fidelity still image. The digital video signal is MPEG encoded to produce an MPEG encoded bitstream and additional bits are employed to encode the selected frame, to produce the MPEG encoded bitstream. The additional bits are determined by fixing the values of MQUANT and "intra DC mult" for all macroblocks in the selected frame. In an alternative method, the extra bits are determined by repeating the selected frame a plurality of times in the digital video signal prior to encoding the selected frame.

24 Claims, 7 Drawing Sheets

METHOD AND APPARATUS FOR ENCODING HIGH-FIDELITY STILL IMAGES IN MPEG BITSTREAMS

FIELD OF THE INVENTION

The present invention is related to the field of digital image processing and more specifically to a technique for encoding high-fidelity still images in MPEG bitstreams.

BACKGROUND OF THE INVENTION

Still image electronic digital cameras that also record snippets of video have recently been introduced to the market. Digital video cameras capable of recording still images have also recently been introduced to the market. These cameras store the image data using only intraframe compression. Some cameras achieve a higher compression ratio for video images by using MPEG encoding (e.g. the Hitachi MP-EG1A camera). However, any still images compressed with MPEG will suffer in quality for the reasons described below. As a result, the still images in cameras, such as the Hitachi camera, are encoded in a separate bit stream using for example JPEG encoding.

Suzuki et. al. have patented a use for encoding still images in an MPEG bitstream (U.S. Pat. No. 5,457,675). They wish to encode a hierarchical menu system as a series of still images in an MPEG bitstream. This alleviates the need for a separate graphical processing unit. The still images that are encoded however, are rather low resolution images (menus) that are intended for display on a television, and therefore do not tax the limits of MPEG encoding.

MPEG1 and MPEG2 are lossy compression techniques for reducing the number of bits needed to represent digital video. The following discussion applies to the MPEG family of video compression standards. For simplicity, they will be collectively referred to as MPEG unless specifically stated. In MPEG, the video is broken up into sequences of pictures called Groups of Pictures (GOP). Each GOP contains up to three different types of pictures. The first type is referred to as an I picture because it is intra-coded. This means that this type of picture uses only spatial compression techniques, such as DCT based compression, and does not rely on any temporal information. The second type of picture is called a P picture because it is predicted from the most recent picture that was either an I picture or a P picture. The third type of picture is a B picture which is bidirectionally predicted from the closest I or P pictures. The I and the P pictures are also referred to as reference pictures because they can be referenced by other P or B frames for the purpose of motion compensation.

The pictures are further broken up into macroblocks of 16×16 pels (picture elements). There are several different types of macroblocks. Intra-coded macro blocks are encoded spatially. Forward predicted macroblocks contain a motion vector pointing to where this macroblock appeared in the previous reference picture. Backward predicted macroblocks contain a motion vector to where this block will appear in the next reference picture. Bidirectionally predicted macroblocks contain two motion vectors, one pointing to where this macroblock appeared in the previous reference picture, and one pointing to where this macroblock will appear in the next reference picture. The predicted macroblocks may contain not only a motion vector, but also some residual information. This information is a spatially compressed difference between the actual block of pixels in the image and the predicted block of pixels. A skipped macroblock contains no information and is essentially the same as a forward predicted macroblock with zero motion vectors and no residual information.

The I pictures can only contain intra-coded macroblocks. The P pictures may contain intra-coded macroblocks, forward predicted macro blocks, and skipped macroblocks. The B pictures may contain all types of macroblocks. Since there is a lot of temporal redundancy in video, the number of bits required to encode a P picture or a B picture is substantially less than the number of bits required to encode an I picture at the same image quality level. For example, in the TM5 encoder which is an informative part of the MPEG 2 standard document (ISO/IEC 13818-2), as a rule of thumb, the I pictures usually have a filesize that is three times the P pictures and six times the B pictures. In MPEG, the image quality is allowed to vary from one picture to another and it can also vary spatially within the picture. The image quality is heavily dependent upon the encoder implementation which has not been standardized. Different MPEG encoders may make different decisions about how to code a particular macroblock, or what is the best motion vector to describe the motion of that macroblock. As a result, different MPEG encoders will produce different quality images while using the same number of bits. Generally, for a given encoder, as the number of bits spent per second (referred to as the bit rate) decreases, the number of artifacts within each picture will increase. Similarly, as the bit rate increases, the artifacts within each picture will decrease.

In the MPEG standard, the final image quality is determined by the elements of a 2-dimensional 8×8 matrix referred to as the quantization matrix. Each element of this matrix determines the step size of the quantizer used to quantize the DCT coefficient located at the corresponding location in the 8×8 DCT matrix. For intra-coded blocks, the DC coefficients of the DCT are quantized separately using a parameter called "intra DC mult". The encoder has the choice of either using a default quantization matrix or downloading a custom matrix. For the default matrix, the values of the elements depend on the macroblock type. For example, for nonintra macroblocks, where the DCT is usually performed on motion-compensated difference blocks, all the quantization matrix elements have the same value. On the other hand, for intra macroblocks, the values of the matrix elements are based on the properties of the human visual system such as the contrast sensitivity function (CSF). In general, the quantizer matrix elements are larger for the higher spatial frequencies, corresponding to coarser quantization of such spatial frequencies. These default quantization matrices can be found in the MPEG standard documents. To achieve the various levels of image quality desired by a given application, the elements of the quantization matrix need to be modified. In MPEG, either a default quantization matrix can be used for each picture, or a new set of intra and nonintra quantization matrices can be downloaded at the beginning of each picture. However, the elements of the quantization matrix can also be changed from one macroblock to another within the same picture. In order to minimize the number of overhead bits required to signal this change, only a scaling of the original (default or downloaded) matrix elements are permitted. This scaling is performed with a 5-bit parameter referred to as "quantiser__scale_code" or MQUANT. The MQUANT parameter is used to provide rate-distortion control. The DC coefficients of the DCT for Intra coded blocks are quantized using a quantization parameter called "intra DC mult".

Since in the MPEG standard, the P or the B frames are encoded with reference to other frames, the picture quality of a given reference frame can potentially affect the picture quality of other frames. For example, if an I picture is encoded with poor image quality, the following P picture that is predicted from this I picture will also suffer from poor image quality unless more bits are spent to encode that P picture. Similarly, if the I and the P pictures are encoded with poor image quality, the B pictures will be encoded with poor image quality as they are predicted from the I and the P pictures. Conversely, if the image quality of the I picture is increased, the image quality of the subsequent P pictures will usually increase without an increase in the number of bits used to encode them. Since the I and the P pictures have higher quality, then the B pictures will also have higher image quality without increasing the number of bits spent on them. It should be noted that the allocation of more bits to a B picture will only improve the image quality of that B picture, as no other pictures are predicted from the B pictures.

MPEG encoders exist in several different levels of flexibility. One level of flexibility is the variability of the bit rate. A variable bit rate encoder allows the number of bits spent on a given picture to be rather arbitrary. For example, on a digital video disk (DVD), the video is encoded using MPEG2. The burst rate for reading from a DVD is around 11 Mb/s (megabits per second). Although a typical bit rate for DVD video is approximately 3.5 Mb/s, a particularly detailed portion of the video can be encoded with significantly more bits. However, even at the maximum bit rate, the number of available bits may not be sufficient to encode a still image in the MPEG bitstream that will have the desired level of quality.

In contrast to variable bit rate encoders, a fixed bit rate encoder only allows for constant bit rates. Generally, this means that the number of bits spent per second is fixed. In practice, this reduces to keeping the number of bits spent per group of pictures (GOP) a constant. It may be impossible to encode a high-fidelity image with an MPEG encoder that is constrained to a constant bit rate because the encoder will not be able to increase the number of bits for a given frame to the level necessary to achieve the desired image quality.

There is a need, therefore, for an improved MPEG compressed video bitstream from which high-fidelity still images can be produced.

SUMMARY OF THE INVENTION

The shortcomings of the prior art are overcome according to the present invention by a method and apparatus for encoding a high-fidelity still image in an MPEG bitstream. According to the invention, a frame in an uncompressed digital video signal is selected for encoding as a high-fidelity still image. The digital video signal is MPEG encoded to produce an MPEG encoded bitstream and additional bits are employed to encode the selected frame, to produce the MPEG encoded bitstream. In one embodiment of the invention, the additional bits are determined by fixing the values of MQUANT and "intra DC mult" for all macroblocks in the selected frame. In an alternative embodiment, the extra bits are determined by repeating the selected frame a plurality of times in the digital video signal prior to encoding the selected frame.

BRIEF DESCRIPTION OF THE DRAWINGS

FIG. 4 is a flow chart illustrating the step of forming a first-encoded picture shown in FIG. 3; and.

DETAILED DESCRIPTION OF THE INVENTION

Figure 1:
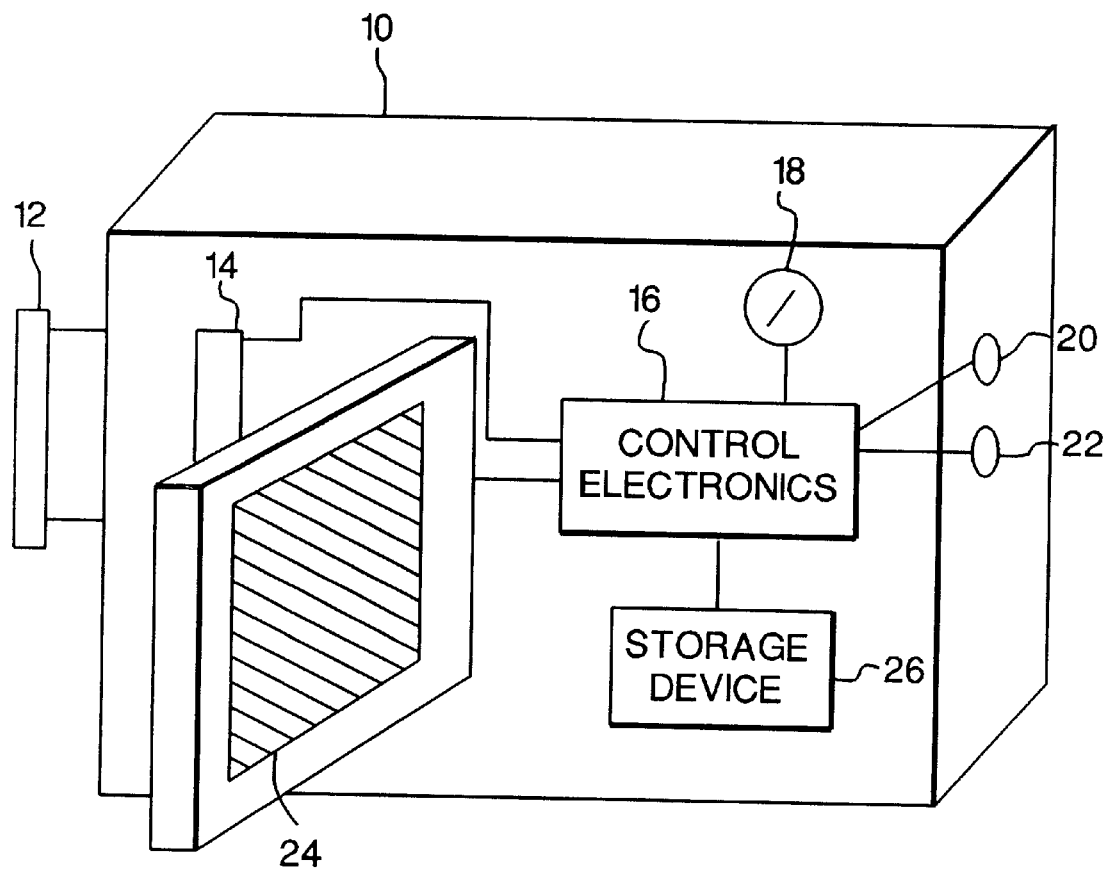
FIG. 1 is a perspective view of a video/still camera employing the method of the present invention.

Referring to FIG. 1, a motion/still camera 10 utilizing the MPEG encoding technique of the present invention is shown. The camera 10 includes a lens 12 for forming an image of a scene onto an image sensor 14, such as a CCD. Control electronics 16 receives the image signal generated by the image sensor 14 and MPEG encodes the image signal in response to signal received from camera controls including a quality adjustment selector 18 for selecting the desired level of quality in selected still images; a record button 20 for actuating the camera to record a video sequence; and a still button 22 for selecting a video frame for encoding as a still image. The camera 10 may include a display device 24, such as a color LCD display screen for reviewing the captured motion sequences and still images embedded in the sequences. The camera 10 is also provided with a storage device 26 for storing the MPEG compressed motion image sequences containing still images. The storage device can be, for example, a digital cassette recorder (DVC), a digital versatile disc (DVD), a memory card, or a magnetic hard drive.

Figure 2:
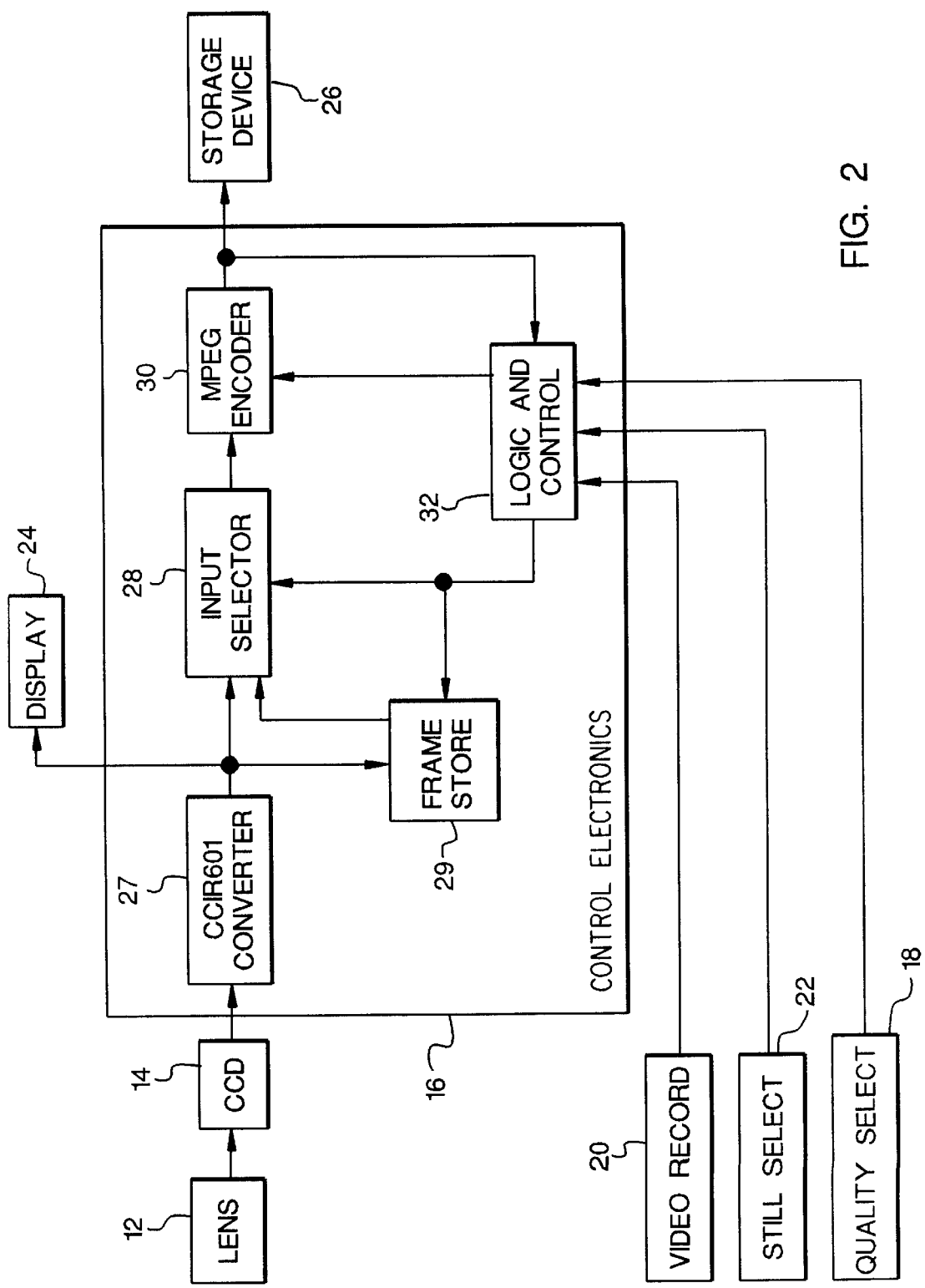
FIG. 2 is a schematic block diagram illustrating the control electronics of the camera of FIG. 1.

As shown in FIG. 2, the control electronics 16 include a CCIR601 (ISO standard) converter 27 for converting the signals from the CCD image sensor 14 to a digital format useable by an MPEG encoder 30. The MPEG encoder 30 is controlled by logic and control circuit 32, which receives the inputs from the quality selector 18; the video record button 20 and the still select button 22. When the still select button 22 is pressed, the logic and control unit 32 signals the frame store 29 to read from the CCIR601 converter 27 and signals the input selector 28 to select the data in the frame store 29, rather than the data originating from the CCIR601 converter 27. When the logic and control unit 32 decides that the still image has been encoded with sufficient quality (as determined by the quality selector 18), the logic and control unit 32 will signal the input selector 28 to select the data originating from the CCIR601 converter 27.

According to one embodiment of the invention, the MPEG encoder 30 is a variable bit rate encoder. In this first type of encoder, any type of picture (I, B, or P) may be used to create a high-fidelity image. Upon receipt of a still select signal from the still select button 22, the logic and control circuit 32 sends a value for MQUANT and "intra DC mult" based on the position of the quality selector 18 to the MPEG encoder 30. The selected MQUANT value and "intra DC mult" are then used for all the macroblocks within the select picture to encode the selected image.

For example, consider a case where the spatial resolution of the video frame is 720×480 (as is customary with DVD) and the objective is to create high-fidelity still images to be viewed on a television screen. Furthermore, assume that the MPEG2 default quantization tables are being used. If the macroblock that is being encoded is an intra macroblock, then a value of MQUANT=4 and an "intra DC mult" of 2 would usually provide a high-fidelity decoded image. Similarly, if the macroblock to be encoded is a nonintra macroblock, then a value of MQUANT=4 might be suitable. The values of MQUANT may vary between 1 and 31. The value of "intra DC mult" may be 1, 2, 4, or 8. For a given camera that uses the MPEG2 default quantization tables, the logic and control circuit 32 may be programmed to respond to the quality selector 18 to vary the value of MQUANT between 1 and 8 and the value of "intra DC mult" between 1 and 8. Although MQUANT and "intra DC mult" are independent parameters, generally as MQUANT is increased, "intra DC mult" will also be increased. One possible program for accomplishing this is shown in Table 1.

TABLE 1

| Quality selector position | MQUANT | "intra DC mult" |
| --- | --- | --- |
| 1 | 1 | 1 |
| 2 | 2 | 1 |
| 3 | 3 | 2 |
| 4 | 4 | 2 |
| 5 | 5 | 4 |
| 6 | 6 | 4 |
| 7 | 7 | 8 |
| 8 | 8 | 8 |

If the objective is to insure a given level of quality in terms of the mean-squared-error, another possibility is to use the default nonintra quantizer matrix with a selected MQUANT for the quantization of both intra and nonintra macroblocks contained in that picture. However, it should be noted that the above values are just recommendations pertaining to a particular example, and the proper choice of the value of MQUANT in any practical implementation of the current invention will be determined by the image quality requirements of that particular application. In fact, in many applications, the user may wish to download custom quantization tables to insure the desired level of image quality.

Figure 3:
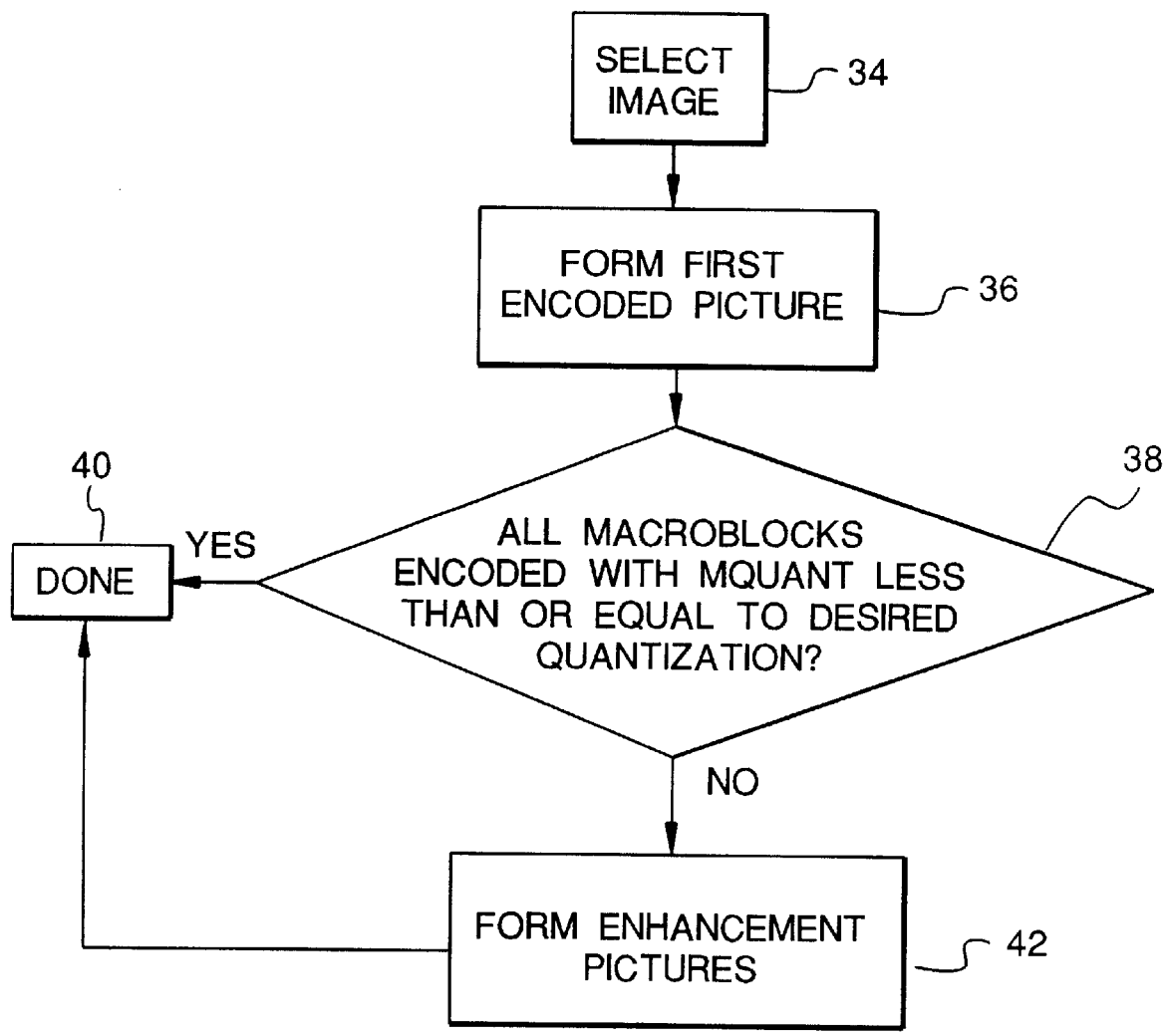
FIG. 3 is a flow chart illustrating one embodiment of the method of the present invention.

Referring to FIG. 3, an alternative method of encoding still images in an MPEG bitstream using a second type of encoder, i.e. a fixed bit rate encoder that allows variable picture types in the GOP structure, is shown. The image that the user selects 34 to encode as a high-fidelity image will be referred to as the user-selected image. The initial encoding of this image will result in the first-encoded picture 36. The logic and control unit 32 tests the first encoded picture 38 to determine if all the macroblocks have been encoded with MQUANT less than or equal to a desired quantization level selected by the quality selector 18. If no further quality enhancements are needed, the encoding of the still image is complete 40. If further quality enhancements to the first-encoded picture are needed, then further enhancement pictures are formed 42 as described below with reference to FIG. 5. Any picture that is formed by re-encoding the user-selected image will be referred to as an enhancement picture.

If further enhancement pictures are required, the first-encoded picture must be a reference picture, that is, an I picture or a P picture and is encoded as described below with reference to FIG. 4. The first enhancement picture will always be formed by predicting from the first-encoded picture. Subsequent enhancement pictures, if needed, will be formed by predicting from either the first encoded picture or a previous enhancement picture, depending on the chosen embodiment for practicing the present invention.

At each stage of the encoding process, including the encoding of the first-encoded picture and the encoding of all the enhancement pictures, the encoder 30 may tag those macroblocks that have been coded with the desired MQUANT so that they can be coded as "skipped" in the subsequent encodings of that macroblock. This can expedite the encoding process, particularly when the encoding is being implemented in software.

In this embodiment, the motion estimation process in MPEG encoder 30 for the enhancement pictures can be disabled by the logic and control circuit 32 to produce zero motion vectors, unless there is a hardware reason not to do so. The rate control is overridden so that each macroblock in an enhancement picture is either skipped or encoded as a predicted macroblock (using the zero motion vectors). Consequently, the enhancement pictures are encoded as simple differences between the user-selected image and previously encoded picture.

Figure 4:
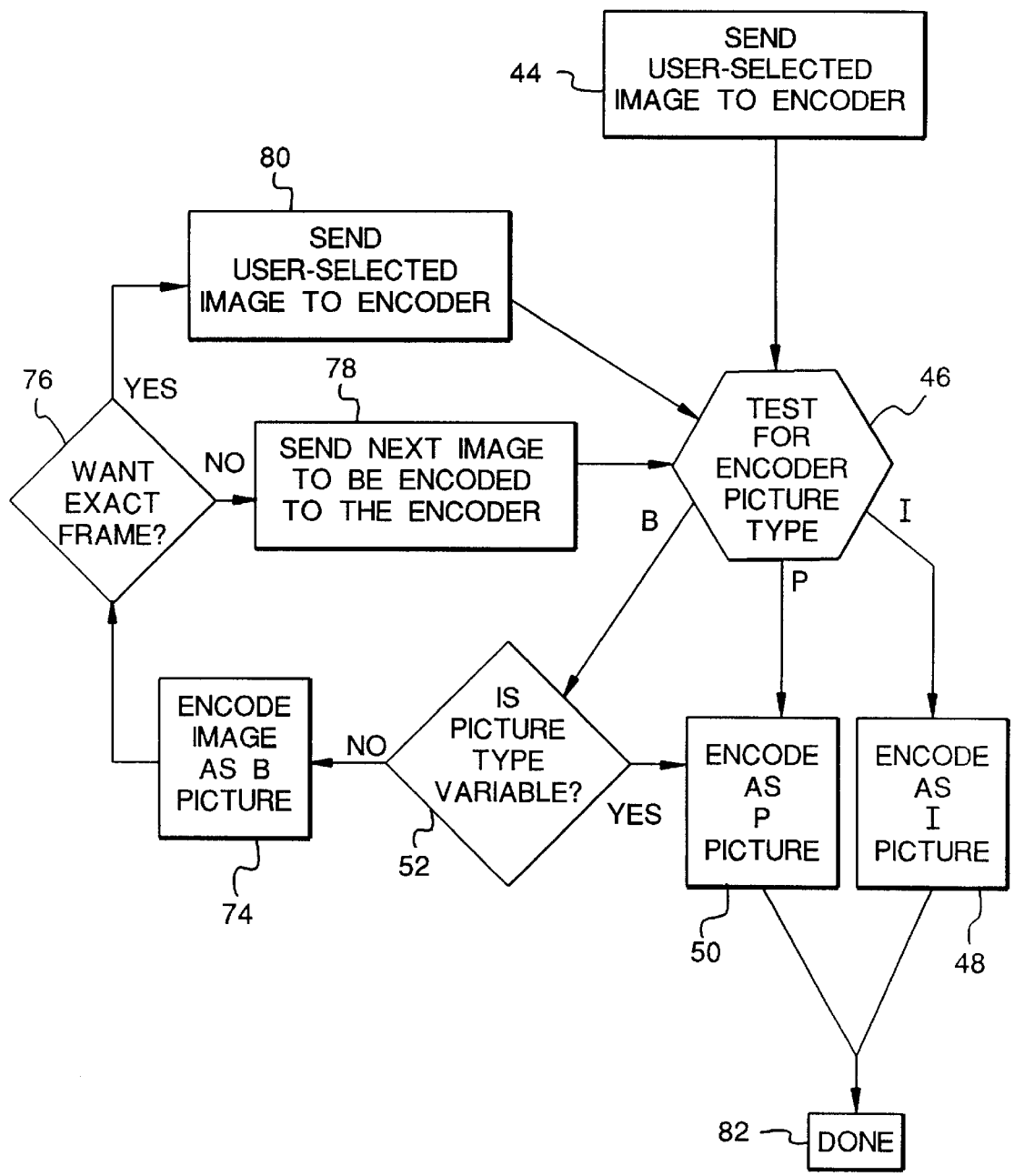

Referring now to FIG. 4, the method of encoding the first encoded picture 36 will be described in more detail. Some MPEG encoders have the ability to vary the GOP structure. An encoder that has provisions for a variable GOP structure allows the ordering of the I, P, and B pictures to be arbitrary within the GOP. The least flexible design will have both a fixed bit rate and a fixed GOP structure. First, the user selected image is sent 44 to the MPEG encoder.

If the bit rate is fixed, but the GOP structure is not fixed, i.e., the ordering of the I, P, and B pictures can be arbitrary within the GOP, the encoding of a high-fidelity image is done by encoding the first-encoded picture as a reference picture and then encoding a plurality of enhancement pictures as P pictures. Once the user selects the frame that will represent the high-fidelity image, three possibilities of picture type exist. The logic and control unit 32 tests 46 to determine the intended picture type for the user-selected image, i.e., the picture type that it would have been coded as had it not been selected by the user. If the intended picture type of the MPEG encoder 30 was an I picture, then the first-encoded picture is preferably encoded as an I picture. If the intended picture type was a P picture, then the first-encoded picture is preferably encoded as a P picture 50, although it can alternatively be encoded as an I picture.

Finally, if the intended picture type was a B picture, and the picture type in the MPEG encoder is variable 52 (as in the present example) its picture type is changed by logic and control unit 32 to be encoded as either a P picture 50 or an I picture 48. The preferred choice in most cases would be to encode it as a P picture. This will usually yield the highest quality in the fewest number of bits. The case where the picture type is not variable (i.e., the answer to test 52 is no) will be dealt with later in the body of this invention.

Figure 5:
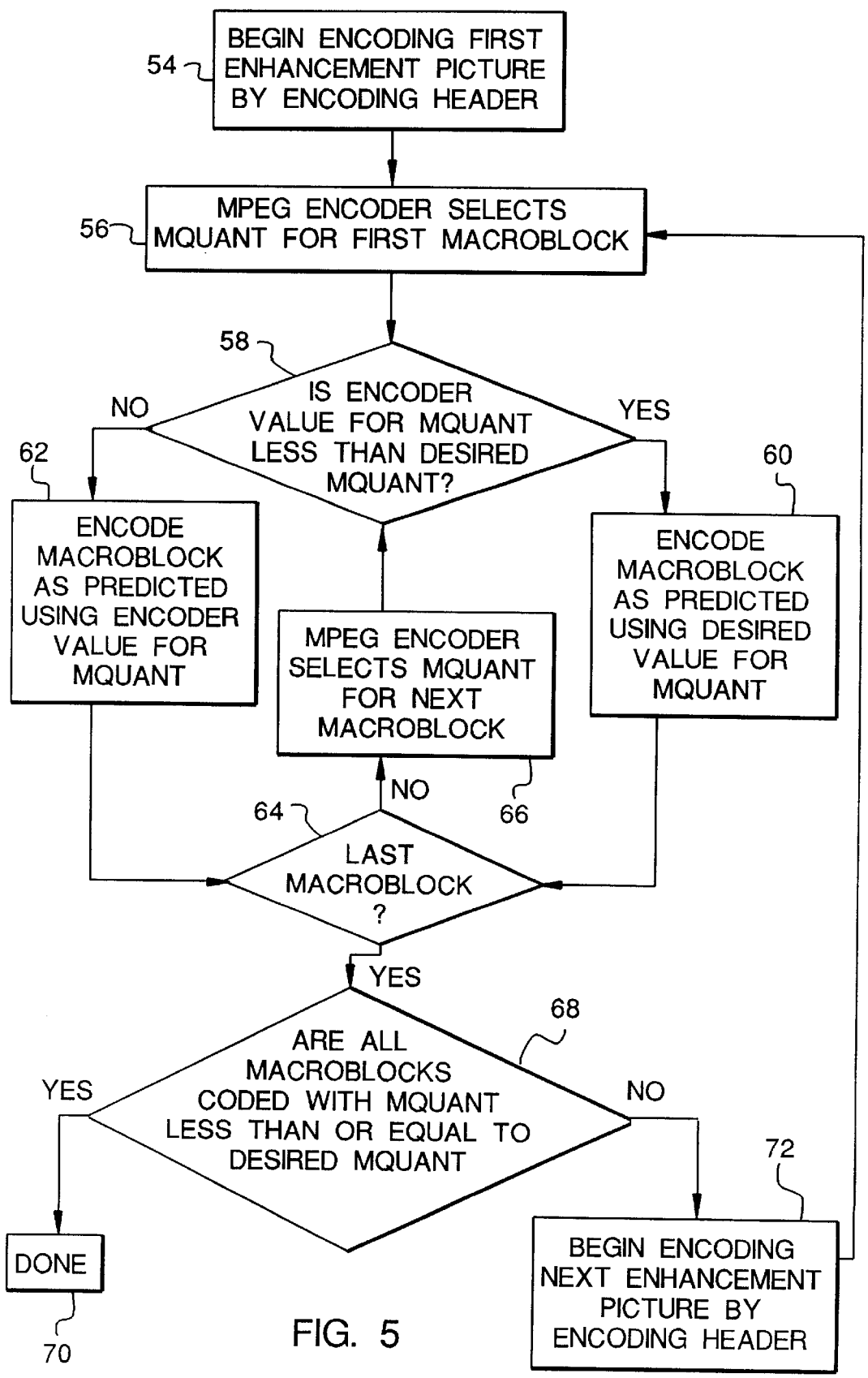
FIG. 5 is a flow chart illustrating the step of forming enhancement pictures in one embodiment of the present invention.

Referring to FIG. 5, the method of forming enhancement pictures (step 42 in FIG. 3) will be described in further detail. First the picture header for the first enhancement picture is encoded 54. Next, the MPEG encoder selects MQUANT for the first macroblock 56. In the current rate control mechanism used in the TM5 encoder, the value of MQUANT (also referred to as the target MQUANT) is determined for the current macroblock based on factors such as the number of bits left to encode the image, the number of macroblocks left to be encoded in the image, and the macroblock type and activity level. The logic and control means checks 58 the selection to determine if MQUANT is less than a desired MQUANT value as determined from the setting of quality selector 18. If the MQUANT is less than the desired MQUANT, then, the logic and control unit 32 instructs the encoder 30 to encode the macroblock using the desired MQUANT. Otherwise, the logic and control unit 32 allows the encoder to encode the macroblock using the encoder generated value for MQUANT 62. A check 64 is made to see if all of the blocks have been encoded. If not, the MPEG encoder selects MQUANT for the next macroblock 66 and the process is repeated.

After all of the macroblocks of the first enhancement picture have been encoded, it may be necessary to encode several more enhancement pictures before the desired quality is achieved. This is determined by checking 68 to see if all macroblocks in the enhancement image have been encoded with MQUANT less than or equal to the desired MQUANT, thereby indicating that the desired quality has been achieved. If so, the process is completed 70. If not, the process is continued by re-encoding the user selected image to produce another enhancement picture 72. In such cases, these additional enhancement pictures will be referred to, respectively, as the second-enhancement picture, the third-enhancement picture, etc., in the encoding order. A further stopping condition, such as the encoding of three consecutive enhancement pictures may be imposed on the process to insure that the video bitstream will not be visibly interrupted during playback.

The first-enhancement picture will be a residual between the user-selected image and the first-encoded picture and is encoded with motion vectors set to zero. One way to insure that the motion vectors are set to zero is to disable the motion estimation module of the encoder and simply set the values to zero. If this is not feasible, the encoder 30 can simply use the estimated motion vectors. The estimated motion vectors will be zero in most cases, except in relatively flat regions with small amounts of noise. In this case, quantizer noise from the encoded picture may actually match the image noise in the original image. This may cause incorrectly estimated motion vectors (i.e., non-zero motion vectors). Since in this scenario, it is assumed that the encoder does not have the flexibility of changing the bit rate, each enhancement picture is allocated the same number of bits that was originally intended for that particular picture.

An example might be helpful in illustrating this concept further. Consider the TM5 encoder, which is an informative part of the MPEG2 standard. If N (the distance between successive I pictures) is 15 and M (the distance between two successive reference pictures) is 3, then the order that a particular GOP is encoded is IPBBPBBPBBPBBIBB where the last I picture belongs to the subsequent GOP. The display order of the decoded sequence is IBBPBBPBBPBBPBBI. Consider a video sequence composed of 30 frames per second at CCIR601 resolution. Encoding this video at 3.5 Mb/s means that there is 1.75 Mb to spend on each GOP. Since the GOP contains 1 I picture, 4 P pictures, and 10 B pictures, a rate control scheme is employed to determine approximately how many bits to spend on each picture. A simple approach is to spend the same number of bits on every frame. In this case, each picture is allotted 117 Kb. In practice, it usually takes more bits to encode an I picture than it does to encode a P picture to the same level of quality, and it takes more bits to encode a P picture than it does to encode a B picture to the same level of quality. A rule of thumb is to encode the I, P, and B pictures using a 6:2:1 ratio for the number of bits used to encode each of them. This results in 438 Kb for each I picture, 145 Kb for each P picture, and 73 Kb for each B picture. This is approximately what the TM5 encoder uses for its initial guess for the bit allotment. The actual values used in a default setup of the TM5 encoder are 400 Kb, 150 Kb, and 75 Kb, respectively, for each I, P, and B picture.

For the purposes of illustration, the chronological order of the frames, as illustrated in the display order example given above, are referred to as frame 1, frame 2, etc. In this example, assume that frame 3 is selected by the user to be encoded as a high-fidelity image. At this point, frame 1 has already been encoded as an I picture, while frame 2 has been stored in a buffer pending the encoding of the next reference picture, i.e. frame 4. According to this embodiment of the present invention, frame 3, which was originally intended to be encoded as a B picture (using 75 Kb), will now be encoded as a P picture, still using 75 Kb. At this point, the image in the buffer, i.e. frame 2, can be encoded with reference to frames 1 and 3. The user-selected, high-fidelity image, which has been encoded in frame 3, is then re-encoded as a P picture in place of frame 4 using 150 Kb. Using zero motion vectors and predicted macroblocks, assures that each enhancement picture is merely an encoding of the residual between the enhancement picture's reference picture and the original image.

Figure 6:
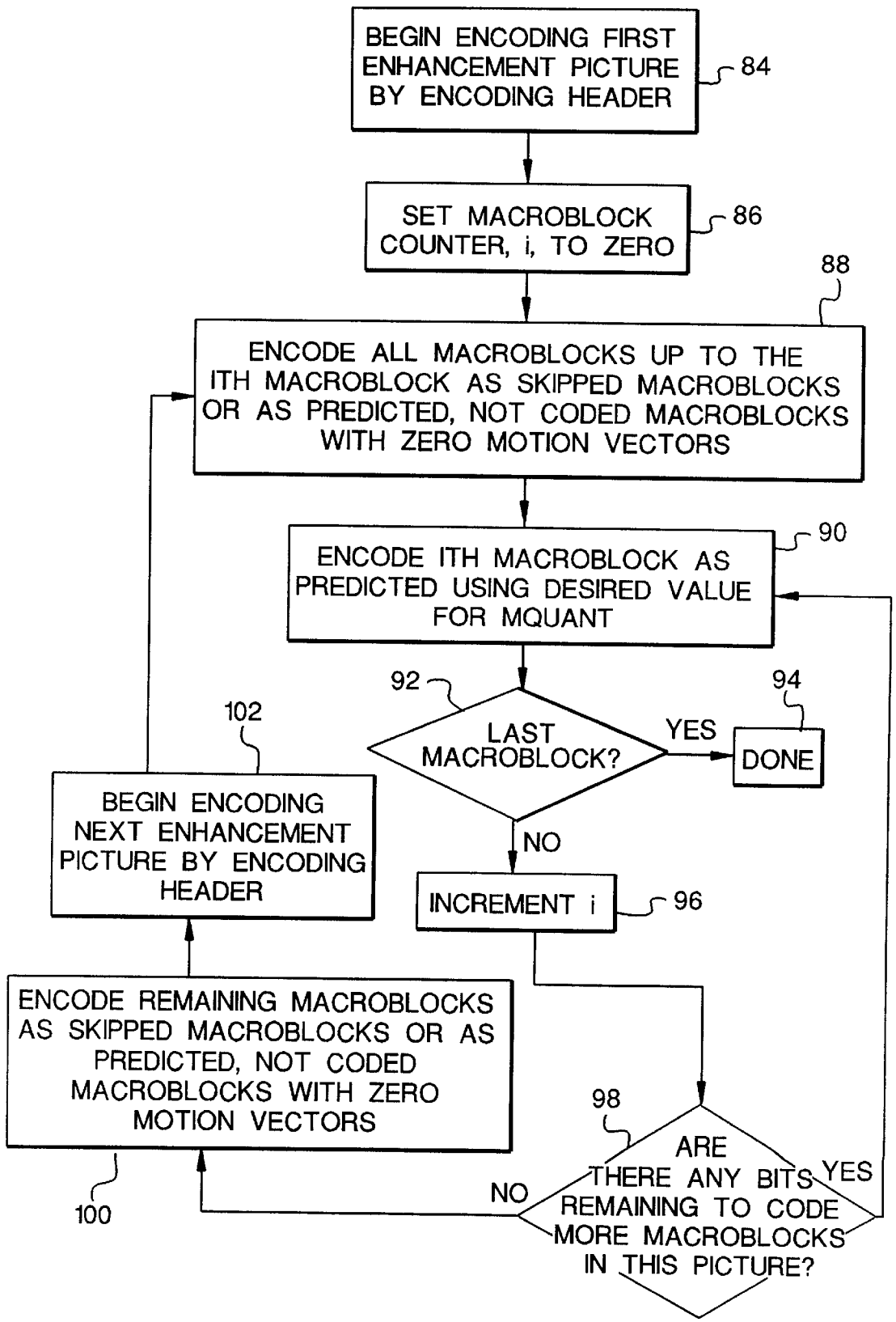
FIG. 6 is a flow chart illustrating the step of forming enhancement pictures in an alternative embodiment of the present invention.

FIG. 6 describes an alternative method for forming enhancement pictures for encoders that do not have a fixed GOP structure. In this case, the value of MQUANT is fixed and is determined by the quality selector 18, and each enhancement picture is encoded as a P picture. First the picture header for the first enhancement picture is encoded 84. Next, the value of the macroblock counter, i, is initialized to zero 86. Each macroblock is then encoded 90 until either the last macroblock is coded 92 or all of the bits are exhausted for this picture 98. If all the macroblocks have been coded 92, then the encoding of the still image is complete. If not, then the value of the macroblock counter, i, is incremented 96. If there are any bits left to code the next macroblock 98, then it is encoded 90. Otherwise, the remaining macroblocks are encoded as skipped 100. Since the first and last macroblocks in a strip cannot be skipped, these must be coded as predicted, not coded macroblocks with zero motion vectors. The next enhancement picture is then encoded. This begins by encoding the header 102. Then, the first i macroblocks are encoded as skipped, with the exception of the first and last macroblocks in each slice 88. This process is repeated until all the macroblocks have been coded 94, or some other suitable stopping condition has been met. The method outlined in FIG. 6 has the advantage over that of FIG. 5 that it will require fewer bits to encode the still image to the same value of MQUANT. The disadvantage is that if the process is stopped before all the macroblocks have been encoded, it would result in a still image that only has the first i macroblocks enhanced. On the other hand, if the technique outlined in FIG. 5 were stopped before all the macroblocks had been encoded with an MQUANT less than the desired MQUANT, a uniform picture quality would be obtained, albeit below the desired level.

Figure 7:
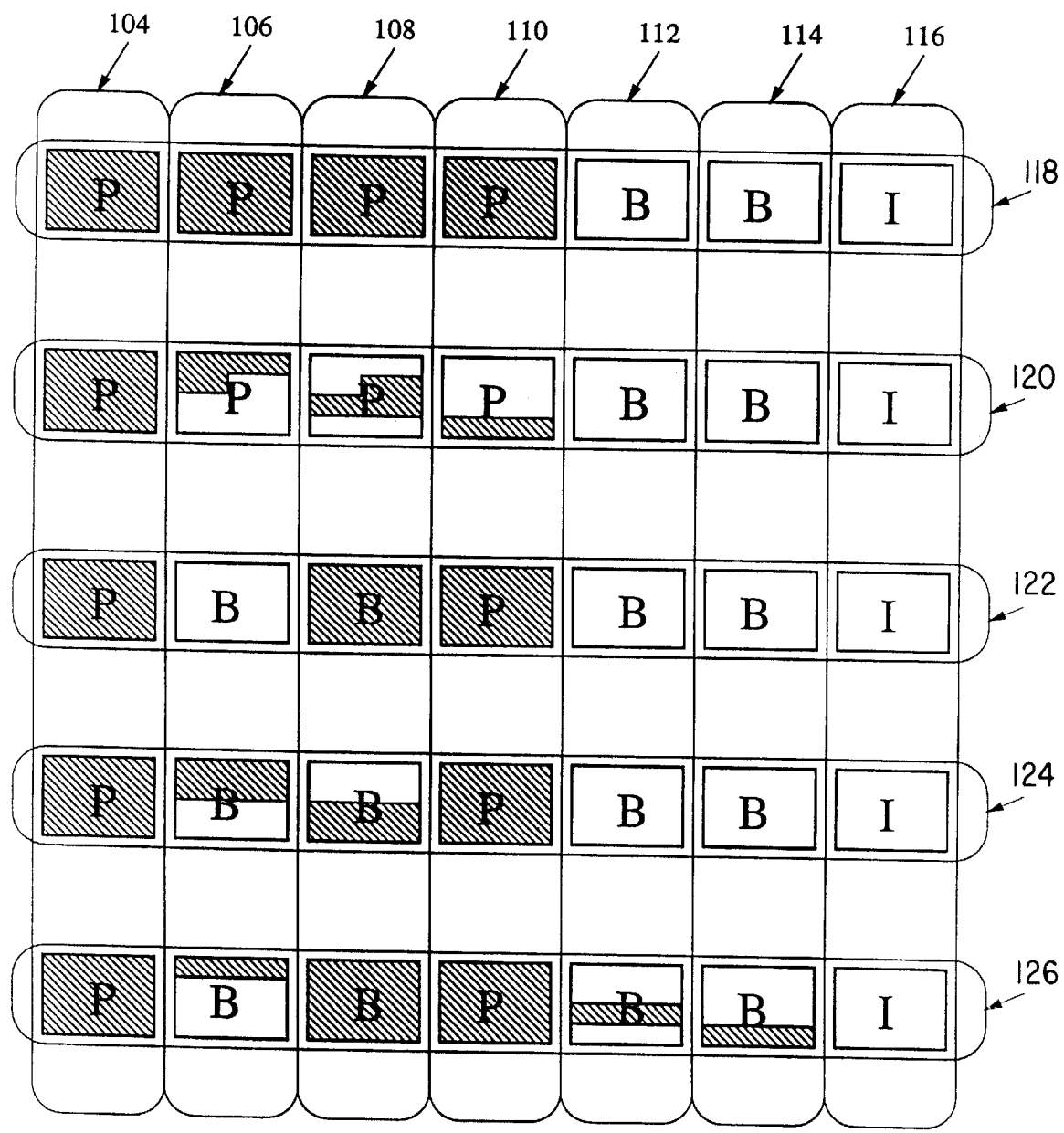
FIG. 7 is a diagram illustrating five different embodiments of the present invention.

Referring to FIG. 7, several of the different possibilities for encoding enhancement pictures are illustrated. Each row of the diagram illustrates one encoding sequence. The successive columns in the diagram illustrate the successive frames in the encoding sequence (e.g. col 104 is the first frame in the sequence, col 106 the second, and so on). For example, row 118 illustrates the embodiment as outlined in FIG. 5. Frame 104 is the first-encoded picture, and the subsequent pictures 106, 108, and 110 are enhancement pictures encoded as P pictures. The video sequence will resume at frame 112, which is encoded as a B picture, and continues with frames 114 and 116. Row 120 in FIG. 7 illustrates the embodiment of this invention as outlined in FIG. 6. Frame 104 is again the first-encoded picture. The first enhancement picture 106 enhances the upper third of the image, as illustrated by the shaded portion of the image. The second enhancement picture 108 enhances the middle third of the image. The third and final enhancement picture 110 enhances the remainder of the image. As in the previous case, the video sequence resumes normal playback at frame 112 and continues with frames 114 and 116.

To avoid a decoder buffer overflow for the case where there are only a few macroblocks that need to be re-encoded in a picture, several approaches may be used. The simplest approach is to use byte stuffing. This entails adding 0's in front of the picture start code or any slice start code in the picture. The number of added 0's will be the same as the number of bytes left to encode this picture after all the macroblocks have been encoded with the desired MQUANT.

Another approach is to keep track of the macroblocks that need to be re-encoded. When re-encoding the picture, these macroblocks will be encoded first. The remaining bits can be used to enhance further the remainder of the picture using a slightly lower value for MQUANT. There are two methods to do this. If the bitstream is formed in a causal fashion, then remaining bits may be spent on the macroblocks that follow the last macroblock that required enhancement. The other option is to go back and re-encode the rest of the macroblocks in the current image with a slightly lower value for MQUANT. As a rule of thumb, MQUANT is allowed to vary by either one code value or ten percent, which ever is larger. This will insure that there are not drastic changes in quality from one part of the image to another.

The third type of encoder, which is the least flexible, is one that has a fixed bit rate and a fixed GOP structure. For this type of encoder, the picture type is not variable, i.e. the pictures cannot be changed to P pictures to provide successive refinement of the original image.

Referring to the previous example of a GOP, assume frame 3 is the one that the user has chosen to encode as a high quality still image. For this example, frame 3 cannot be enhanced because it is a B picture, and nothing may be predicted from a B picture. Referring to FIG. 4, at this point, the encoder 30 encodes the frame as a B picture 74 and can implement either of the following two options for selecting the frame that represents the high-fidelity image.

According to one option, if the exact frame selected by the user is not required 76 the encoder 30 is instructed by the logic and control unit 32 to continue encoding the video sequence 78 until it receives the next reference frame (which is frame 4 in this example), and to use that next reference frame as the first-encoded picture (48 or 50). A potential advantage of this approach is that it minimizes the disruptions in the video playback. That is, frame 2 and frame 3 are encoded as they would normally have been and, as a result, the action will not be stopped during the playback of those frames. However, a potential drawback of this implementation is that some changes might occur in the scene between the user-selected frame and the subsequent reference frame and the content of the enhanced frame might not exactly correspond to that of the user-selected frame.

According to the second option, if the exact frame selected by the user is required, rather than continuing to encode the video sequence, the user selected image is repeatedly sent 80 to the encoder 30 until it is encoded as either an I or a P picture (48 or 50). The advantage of this approach is that the high-resolution still image will correspond exactly to the user-selected frame. However, this option has the possibility of introducing the potentially undesirable effect of stopping the action at the time of the playback for one or more frames (frame 3 in our example), depending on the location of the user selected frame in the GOP structure.

After the first-encoded picture has been encoded with either of the above procedures, the encoder can create any number of enhancement pictures up to the next I picture. If the required image fidelity is not too high, in many cases it might be achieved by using only a single enhancement picture. In this case, either the B picture immediately preceding the first-encoded picture or the B picture immediately following the first-encoded picture may be used as the enhancement image. This will minimize the disruption during video playback of the MPEG bitstream. This embodiment is illustrated in FIG. 7 row 122. Frame 110 is the first-encoded picture. Frame 108 is the enhancement picture. If more than one enhancement image is required to achieve the desired image quality, then there are two options.

The first option is to utilize the next P picture as the first-enhancement picture. More enhancement pictures can then be predicted from this first-enhancement picture. This is also illustrated in FIG. 7 row 122. Now assume that frame 104 is the first-encoded picture. Frame 110 is now the first enhancement picture, and frame 108 is encoded as the second enhancement picture. The advantage to this technique is that multiple enhancement pictures can be encoded using encoders based on the TM5 MPEG encoder. The disadvantage is that frame 106 does not contribute to the high-quality still image. To provide the smoothest video playback, it should be encoded using the same input image as the first encoded picture 104. Since frame 106 provides no enhancement to the still image, though, any bits spent on frame 106 are, for all practical purposes, wasted. Therefore, if the encoder 30 will allow for it, it is recommended that the macroblocks in frame 106 are coded as skipped (except for the first and last macroblock of each slice).

The alternative is to add some intelligence to the decoder. In this case, the B pictures will be used to enhance only a portion of the image in a manner similar to that outlined in FIG. 6. Assume that there are M-1 B pictures between successive reference pictures. The $m^{th}$ B picture will have enhancements for macroblocks (m-1)N/(M-1) to mN/(M-1) where N is the number of macroblocks in the picture, and the rest of the macroblocks will be skipped, except for the first and last macroblocks in each slice.

In the TM5 MPEG2 encoder, the number of bits to be used for the encoding of a given macroblock is determined by the rate controller based on the number of bits left for the entire picture and the number of macroblocks left to be encoded in that picture. One method of modifying the rate control mechanism of TM5 to accommodate this embodiment of the present invention, i.e., to spend the entire bit budget to encode only N/(M-1) macroblocks of the B picture, is to tell the rate controller that the bit budget for this B picture is (M-1)-(m-1) times the actual number of bits allocated to this picture.

As an example, consider the case where M-1=2, the number of bits for each B pictures is 75 Kb, and the number of macroblocks is 1200. The rate controller will encode the first 600 macroblocks of the B picture assuming a bit budget of 150 Kb for the entire picture. In doing so, 75 Kb would be allocated to the first 600 macroblocks. The next 600 macroblocks would be either skipped or, in the case of the first and last macroblocks of each strip, encoded as motion compensated, not coded, with zero motion vectors. On the other hand, the second B picture would have its first 600 macroblocks skipped (except for the first and last macroblock of each strip), while the next 600 macroblocks would be encoded using 75 Kb.

This example is illustrated in FIG. 7 row 124. Frame 104 is the first encoded picture, and frame 110 is the first enhancement picture. Frame 106 is the second enhancement picture that enhances the first half of the macroblocks in the picture. Frame 108 is the third enhancement picture that enhances the second half of the macroblocks in the picture. Note that both frame 106 and frame 108 are backward predicted from frame 110. If a standard MPEG decoder is used to decode these pictures, the enhancements encoded in frame 106 will be lost when frame 108 is decoded. To avoid this, an enhanced MPEG decoder must be used.

The standard MPEG decoder has to be modified to recognize the situation when a high-fidelity image has been encoded in the bitstream. This can be accomplished by adding user data at the encoder before each enhancement to inform the decoder if an enhancement picture has been encoded and whether it enhances the entire image or only a portion of it. The decoder then constructs a high-fidelity image by decoding the first-encoded picture and all the enhancement pictures, taking only the appropriate macroblocks from any B picture that enhances a portion of the image.

As mentioned before, in many applications, a single enhancement image is all that will be required. For such applications, the preferred embodiment of the invention is to encode the user-selected image as a reference picture, and to encode the enhancement picture as either the preceding B picture or the subsequent B picture. However, in those cases where more than one enhancement picture is necessary and when the first enhancement picture has been encoded as a P picture, the first-enhancement picture may be treated as the first-encoded picture and all of the options described above are again available for further enhancing the image. It should be kept in mind that if any of the enhancement pictures is encoded as a B picture, no further enhancement to the image may be made unless the B pictures are encoded as partial enhancements as mentioned above. As shown in FIG. 7 row 126, the B pictures used for enhancement in this technique are not limited to the ones occurring before or after the enhancement picture. In fact, both the B pictures before the enhancement picture and the B pictures after the enhancement picture may be used. In this case, frames 106 and 108 are backward predicted from frame 110, and frames 112 and 114 are forward predicted from frame 110. In this case, each of the B pictures can be used to enhance a quarter of the still image, allowing the use of more bits for performing the enhancement.

In all the embodiments mentioned above, the information about the location of the high-fidelity image needs to be conveyed to the decoder. This may be done in one of two ways. Either the system can insert a user data field into the MPEG bitstream, or it may send an external signal to notify the decoder of the location of the enhancement picture. The only time the decoder needs to be notified that it has a still image is when it has to do something non-standard. For most cases, everything done is standard, and the only information that needs to be conveyed is the location of the final enhancement picture. For purposes of ease of decoding, it may also be useful to convey information regarding the location of the first-encoded picture and possibly the locations of any of the enhancement pictures. Once the final enhancement picture is decoded as an image, that image represents the user-selected high-fidelity image. In the case where the B pictures are used to enhance only portions of the image, the decoder must be notified of the location of the enhancement pictures, and also which portion of the image the enhancement picture was meant to enhance.

The invention has been described in detail with particular reference to certain preferred embodiments thereof, but it will be understood that variations and modifications can be effected within the spirit and scope of the invention.

PARTS LIST

10 camera
12 lens
14 image sensor
16 control electronics
18 quality selector
20 record button
22 still selector
24 display device
26 storage device
27 CCIR601 converter
28 input selector
29 frame store
30 MPEG encoder
32 logic and control unit
34 select image step
36 form encoded picture step
38 MQUANT test
40 done step
42 form enhancement pictures step
44 send image to encoder step
46 test picture type
48 encode I picture step
50 encode P picture step
52 variable picture type test
54 encode first enhancement picture step
56 select MQUANT step
58 MQUANT test
60 encode macroblock step
62 encode macroblock step
64 last macroblock test
66 encode next macroblock step
68 MQUANT test
70 Done step
72 encode next enhancement picture step
74 encode B picture step
76 exact frame test
78 send next image step
80 send user selected image to encoder step
82 done step
84 encode first enhancement picture step
86 initialize macroblock counter step
88 skip macroblock step
90 encode macroblock step
92 last macroblock test
94 done step
96 increment macroblock counter step
98 bits remaining test
100 skip macroblock step
102 begin next picture step
104–116 columns of pictures
118–126 rows of picture sequences

What is claimed is:

1. A method of encoding a high-fidelity still image in an MPEG bitstream, comprising the steps of:
   a) selecting a frame in an uncompressed digital video signal for encoding as a high-fidelity still image;
   b) MPEG encoding the digital video signal, using additional bits to encode the selected frame, to produce an MPEG encoded bitstream.

2. The method claimed in claim 1, where the additional bits in step b are determined by fixing the value of MQUANT and "intra DC mult" for all macroblocks in the selected frame.

3. The method claimed in claim 1, where the additional bits in step b are determined by repeating the selected frame a plurality of times in the digital video signal prior to encoding the selected frame.

4. The method claimed in claim 1, further comprising the step of inserting user data in the MPEG bitstream indicating the location of the high-fidelity still images.

5. The method claimed in claim 3, further comprising the step of adjusting MQUANT in the MPEG encoding step to successively finer levels for each subsequent repeated frame.

6. The method claimed in claim 5 where the adjustment of MQUANT consists of the following steps
   a) determining a desired value for MQUANT;
   b) comparing the MQUANT value determined by the MPEG encoder for each macroblock with the desired value for MQUANT;
   c) if the value of MQUANT determined by the MPEG encoder is smaller than the desired value for MQUANT, substituting the desired value for the determined value; and
   d) if the value of MQUANT determined by the MPEG encoder is larger than the desired value for MQUANT, utilizing the value of MQUANT determined by the MPEG encoder.

7. The method claimed in claim 3, further comprising the step of fixing MQUANT in the MPEG encoding step and encoding only successive portions of the macroblocks of each subsequent repeated frame, and skipping the remainder of the macroblocks in the repeated frames.

8. The method claimed in claim 3, wherein the selected frame is encoded as an I or P picture and repetitions of the selected frame are encoded as B or P pictures.

9. The method claimed in claim 8, wherein the repetitions of the selected frame are encoded as B pictures and only a portion of the macroblocks of each B picture is encoded and the remainder of the macroblocks in the B picture are skipped.

10. The method claimed in claim 3, wherein the repeated frames occur before and after the selected frame in the uncompressed digital video signal.

11. The method claimed in claim 1, further comprising the step of indicating the location of the high-fidelity still images in an external data base.

12. The method claimed in claim 9, further comprising the steps of:
   a) decoding the selected frame; and
   b) decoding only the macroblocks that were encoded in the repeated frames and not decoding the skipped macroblocks.

13. Apparatus for producing an MPEG bitstream having one or more high-fidelity still images, comprising:
   a) means for generating an uncompressed digital video signal;
   b) means for selecting a frame in the uncompressed digital video signal to be compressed as a high-fidelity still image;
   c) means for repeating the selected frame in the uncompressed digital video signal; and
   d) an MPEG encoder for encoding the digital video signal containing repeated frames.

14. The apparatus claimed in claim 13, further comprising means for inserting user data in the MPEG bitstream indicating the location of the high-fidelity still images.

15. The apparatus claimed in claim 13, wherein the MPEG encoder encodes the selected frame as an I or P picture and the repeated frames as B or P pictures.

16. The apparatus claimed in claim 13, further comprising means for adjusting quantization in the MPEG encoder to successively finer levels for each subsequent repeated frame.

17. The apparatus claimed in claim 16, wherein the means for adjusting quantization includes:
   a) means for determining a desired value for quantization;
   b) means for comparing the quantization determined by the MPEG encoder for each macroblock with the desired quantization;
   c) means for substituting the desired quantization for the determined value if the quantization determined by the MPEG encoder is finer than the desired quantization; and
   d) means for utilizing the quantization determined by the MPEG encoder if the quantization determined by the MPEG encoder is coarser than the desired quantization.

18. The apparatus claimed in claim 13, further comprising means for fixing the quantization in the MPEG encoder and encoding only successive portions of the macroblocks of each subsequent repeated frame, and skipping the remainder of the macroblocks in the repeated frames.

19. The apparatus claimed in claim 13, wherein the MPEG encoder encodes the selected frame as an I or P picture and encodes repetitions of the selected frame as B or P pictures.

20. The apparatus claimed in claim 19, wherein the MPEG encoder encodes repetitions of the selected frame as B pictures and encodes only a portion of the macroblocks of each B picture and skips the remainder of the macroblocks in the B picture.

21. The apparatus claimed in claim 13, wherein the repeated frames occur before and after the selected frame in the uncompressed digital video signal.

22. The apparatus claimed in claim 13, further comprising means for indicating the location of the high-fidelity still images in an external data base.

23. The apparatus claimed in claim 20, further comprising:
   a) means for decoding the selected frame; and
   b) means for decoding only the macroblocks that were encoded in the repeated frames and not decoding the skipped macroblocks.

24. Apparatus for producing an MPEG bitstream having one or more high-fidelity still images, comprising:
   a) means for generating an uncompressed digital video signal;
   b) means for selecting a frame in the uncompressed digital video signal to be compressed as a high-fidelity still image;
   c) an MPEG encoder for encoding the digital video signal; and
   d) means for keeping the quantization constant for each macroblock in the MPEG encoder.

* * * * *